United States Patent
Thielen

(10) Patent No.: US 7,294,666 B2
(45) Date of Patent: Nov. 13, 2007

(54) TIRE WITH COMPONENT OF RUBBER COMPOSITION COMPRISED OF SILICA REINFORCEMENT AND EMULSION POLYMERIZATION DERIVED TERPOLYMER RUBBER OF DIENE/VINYL AROMATIC COMPOUND WHICH CONTAINS PENDANT HYDROXYL GROUPS

(75) Inventor: Georges Marcel Victor Thielen, Schouweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 571 days.

(21) Appl. No.: 10/090,403

(22) Filed: Mar. 4, 2002

(65) Prior Publication Data

US 2002/0173560 A1    Nov. 21, 2002

Related U.S. Application Data

(60) Provisional application No. 60/276,653, filed on Mar. 16, 2001.

(51) Int. Cl.
*C08K 3/34* (2006.01)

(52) U.S. Cl. .................................. 524/492; 524/495

(58) Field of Classification Search ............... 524/492, 524/493, 495, 496
See application file for complete search history.

(56) References Cited

U.S. PATENT DOCUMENTS

| | | | |
|---|---|---|---|
| 4,150,014 A | 4/1979 | Edwards et al. ......... 260/42.32 |
| 4,150,015 A | 4/1979 | Edwards et al. ......... 260/42.37 |
| 4,152,308 A | 5/1979 | Edwards et al. ......... 260/23 |
| 4,357,432 A | 11/1982 | Edwards ................. 523/351 |
| 5,723,531 A | 3/1998 | Visel et al. ............. 524/496 |
| 5,902,852 A | 5/1999 | Schulz et al. ........... 524/821 |
| 6,008,272 A | 12/1999 | Mahmud et al. ........ 523/351 |
| 6,019,832 A | 2/2000 | Kawazoe et al. ....... 106/472 |
| 6,020,068 A | 2/2000 | Kawazura et al. ...... 428/405 |
| 6,028,137 A | 2/2000 | Mahmud et al. ........ 524/496 |
| 6,111,045 A * | 8/2000 | Takagishi et al. ....... 526/338 |
| 6,145,488 A | 11/2000 | Plechner ................. 123/193.1 |
| 6,160,047 A | 12/2000 | Agostini et al. ........ 524/494 |
| 6,172,137 B1 | 1/2001 | Agostini et al. ........ 523/212 |
| 6,197,274 B1 | 3/2001 | Mahmud et al. ........ 423/449.2 |

FOREIGN PATENT DOCUMENTS

EP       0806452       11/1997
EP       1205506        5/2002

OTHER PUBLICATIONS

European Search Report, Jun. 26, 2002.

* cited by examiner

*Primary Examiner*—Edward J. Cain
(74) *Attorney, Agent, or Firm*—Henry C. Young, Jr.

(57) ABSTRACT

This invention relates to a tire having at least one component of a silica reinforced rubber composition comprised of an emulsion polymerization derived terpolymer rubber which contain pendant hydroxyl groups, particularly derived from diene hydrocarbon and vinyl aromatic compound monomers, particularly a hydroxyalkyl methacrylate. Preferably the hydroxyalkyl methacrylate is a hydroxypropyl methacrylate (HPMA). Preferably at least one additional elastomer is blended with the terpolymer rubber. The rubber composition is prepared by blending a coupling agent therewith subsequent to the addition said silica reinforcement. Said tire component may be, for example, a tire tread.

11 Claims, No Drawings

TIRE WITH COMPONENT OF RUBBER COMPOSITION COMPRISED OF SILICA REINFORCEMENT AND EMULSION POLYMERIZATION DERIVED TERPOLYMER RUBBER OF DIENE/VINYL AROMATIC COMPOUND WHICH CONTAINS PENDANT HYDROXYL GROUPS

The Applicants hereby incorporate by reference prior U.S. Provisional Application Ser. No. 60/276,653, filed on Mar. 16, 2001.

FIELD OF THE INVENTION

This invention relates to a tire having at least one component of a silica reinforced rubber composition comprised of an emulsion polymerization derived terpolymer rubber which contains pendant hydroxyl groups derived from diene hydrocarbon and vinyl aromatic compound monomers, particularly a hydroxyalkyl methacrylate. Preferably the hydroxyalkyl methacrylate is a hydroxypropyl methacrylate (HPMA). Preferably at least one additional elastomer is blended with the terpolymer rubber. The rubber composition is prepared by blending a coupling agent therewith subsequent to the addition said silica reinforcement. Said tire component may be, for example, a tire tread.

BACKGROUND OF THE INVENTION

Vehicular tires, particularly pneumatic tires, are sometimes provided with a component such as, for example, a tread which is comprised of a rubber composition which contains silica, particularly amorphous precipitated silica, reinforcement.

Typically the rubber composition of the component also contains a coupling agent to aid in enhancing the reinforcing effect of the silica for the respective elastomer(s) of the rubber composition such as, for example, a tire tread. The use of coupling agents for such purpose is well known to those having skill in such art.

Elastomer blends which contain, for example, cis 1,4-polybutadiene and styrene/butadiene elastomers are often used for such tire component (e.g. tire tread). Rubber compositions may also contain various amounts of additional diene-based elastomers such as, for example, one or more of cis 1,4-polyisoprene, cis 1,4-polybutadiene, medium vinyl polybutadiene, styrene/butadiene copolymers, isoprene/butadiene copolymers, and minor amounts of 3,4-polyisoprene.

For the above mentioned styrene/butadiene copolymer rubber, both emulsion polymerization prepared and organic solvent polymerization prepared styrene/butadiene copolymer elastomers have been used. Also, historically, emulsion polymerization derived terpolymer elastomers comprised of units derived from styrene and 1,3-butadiene together with an additional monomer have been prepared and proposed for use for various products.

For example, according to U.S. Pat. No. 5,902,852, it has been proposed to modify asphalt cement with a rubbery terpolymer prepared by emulsion polymerization which is comprised of repeat units derived from conjugated diolefin monomer, such as, for example, cis 1,4-polybutadiene, vinyl aromatic monomer such as styrene and a small amount of hydroxypropyl methacrylate (HPMA).

For example, hydroxy-containing polymers and silica are variously disclosed in U.S. Pat. Nos. 4,150,014, 4,150,015, 4,152,308 and 4,357,432. However it is not seen that it was contemplated to include an alkoxysilane/polysulfide silica coupler in such blends and which is considered herein to present the above problem of relatively large Mooney viscosity increase of such a mixture within an internal rubber mixer.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

The term "phr" if used herein, and according to conventional practice, refers to "parts of a respective material per 100 parts by weight of rubber, or elastomer".

The Tg of an elastomer, if referred to herein, refers to a "glass transition temperature" of the elastomer which can conveniently be determined by a differential scanning calorimeter at a heating rate of 10° C. per minute.

SUMMARY PRACTICE OF THE INVENTION

In accordance with this invention, a tire is provided having a tread of a rubber composition which is prepared by blending, based on 100 parts by weight (phr) of rubber:

(A) 100 phr of elastomers comprised of
(1) about 10 to about 100, alternatively about 25 to about 75, phr of aqueous emulsion polymerization prepared terpolymer rubber comprised of repeat units derived from:
  (a) about 49.5 to about 84.5 weight percent of a conjugated diene monomer which contains from 4 to 8 carbon atoms, preferably selected from 1,3-butadiene and isoprene and more preferably 1,3-butadiene,
  (b) about 15 to about 50, preferably about 25 to about 40, weight percent of a vinyl aromatic monomer selected from at least one of styrene and alphamethyl styrene, more preferably from styrene, and
  (c) about 0.5 to about 5 weight percent of at least one co-monomer selected from hydroxyalkyl acrylates and hydroxyalkyl acrylamides, as the case may be, of the following general formulas (I), (II) and (II), preferably formula (I):

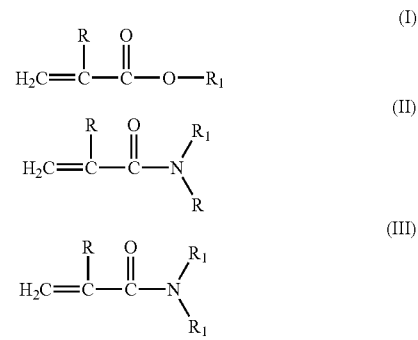

wherein R represents a hydrogen atom or an alkyl group containing from 1 through about 8 carbon atoms, preferably a hydrogen atom or an alkyl group containing from 1 through about 4 carbon atoms, preferably a hydrogen atom or a methyl group and more preferably a methyl group;

wherein $R_1$ represents a saturated alcohol group containing from about 1 through about 8 carbon atoms, preferably from 1 through 4 carbon atoms and preferably selected from at least one of hydroxyethyl and hydroxypropyl groups and preferably a hydroxypropyl group, wherein said saturated alcohol group is selected from primary, secondary and tertiary alcohol groups.

(2) from zero to about 90, alternatively about 25 to about 75, phr of at least one additional conjugated diene-based elastomer, selected from homopolymers and copolymers of at least one of isoprene and 1,3 butadiene and copolymers of at least one of isoprene and 1,3-butadiene with a vinyl aromatic compound selected from styrene and alphamethyl styrene, preferably styrene, (B) about 40 to about 120, alternately about 40 to about 90, phr of reinforcing filler selected from at least one of carbon black and particulate silica-containing material selected from at least one of synthetic amorphous silica and silica treated carbon black with domains of silica on its surface, preferably synthetic silica;

wherein said filler is comprised of
(1) about 35 to about 90 phr of carbon black and about 5 to about 30 phr of said silica-containing material, or
(2) about 5 to about 30 phr of carbon black and about 35 to about 90 phr of said silica-containing material, and (C) about 0.5 to about 10, alternately about 1 to about 7, phr of at least one silica coupling agent having a moiety reactive with hydroxyl (e,g, silanol groups) on the surface of the said silica and on the surface of said silica domains on the surface of said silica treated carbon black, and an additional moiety interactive with the said elastomer(s);

wherein said rubber composition is prepared by a process which comprises:
(1) blending, in at least one sequential mixing step in an internal mixer and in the absence of free sulfur, said terpolymer rubber, and additional diene-based elastomer(s) if used, together with said reinforcing filler(s), to a temperature in a range of about 140° C. to about 175° C.;
(2) subsequently blending therewith in the same or subsequent sequential mixing step, preferably in an internal rubber mixer, and in the absence of free sulfur, said coupling agent and the remaining amount of said silica-containing material , to a temperature in a range of about 140° C. to about 175° C.,
(3) subsequently blending free sulfur therewith, preferably in an internal rubber mixer, to a temperature in a range of about 95° C. to about 125° C.

Said hydroxy alkyl acrylate co-monomer is of structural formula (I) may be, for example, selected from at least one of hydroxymethyl methacrylate, 2-hydroxyethyl methacrylate, 2-hydroxypropyl methacrylate (HPMA isomer), 3-hydroxypropyl methacrylate (HPMA isomer), 3-phenoxy-2-hydroxypropyl methacrylate, hydroxybutyl methacrylate, hydroxyhexyl methacrylate and hydroxyoctyl methacrylate.

Preferably said hydroxyalkyl acrylate co-monomer of structural formula (I) is selected from at least one of hydroxymethyl methacrylate, 2-hydroxyethyl methacrylate, 2-hydroxypropyl methacrylate and 3-hydroxypropyl methacrylate.

Alternatively, said co-monomers are selected from at least one of 2-hydroxypropyl metbacrylate and 3-hydroxy-propyl methacrylate (HPMA isomers) which may be used as a blend thereof in weight ratio, for example, in a range of from about 85/15 to about 60/40, respectively.

Alternately, said hydroxy alkyl acrylamide co-monomer is of structural formula (II) and/or (III) which may be, for example, selected from at least one of hydroxymethyl methacrylamide, 2-hydroxyethyl methacrylamide, 2-hydroxypropyl methacryloamide and 3-hydroxypropyl methacrylamide, 3-phenoxy-2-hydroxy-2-hydroxypropyl methacrylamide, hydroxybutyl methacrylamide, hydroxyhexyl methacrylamide and hydroxyoctyl methacrylamide.

Alternatively, although considered herein as being of less significance, said hydroxyl alkyl acrylate co-monomer may be selected from at least one of 3-chloro-2-hydroxypropyl methacrylate, di-(ethylene glycol) itaconate, di-(propylene glycol) itaconate, bis(2-hydroxypropyl) itaconate, bis(2-hydroxyethyl) itaconate, bis(2-hydroxyethyl) fumarate, bis(2-hydroxy-ethyl) maleate, and hydroxy-methyl vinyl ketone.

In practice, as hereinbefore related, said co-monomer is preferably an hydroxyalkyl acrylate of said formula (I) and more preferably a hydroxypropyl methacrylate If desired, a portion of the silica-containing material, namely the synthetic silica and/or silica treated carbon black as the case may be, is added to the rubber composition in one mixing step and the remainder added in a subsequent mixing step, in the same or separate rubber mixer.

In practice, the coupling agent is added subsequent to the final addition of the silica-containing material, preferably at least one minute subsequent to the addition of the silica.

In practice, the mixing steps for the blending of the elastomer(s), reinforcing filler(s) and coupler may, in general be conducted for a total mixing time for the total mixing steps in a range of about 3 to about 10 minutes. The mixing time for addition of the free sulfur vulcanizer, together with a vulcanizing accelerator and optionally with a vulcanization retarder, for a period of from 1.5 to about 4 minutes.

A significant aspect of this invention is the preparation of the said emulsion polymerization derived terpolymer in a step-wise preparation of the rubber composition in which the coupling agent is required to be added subsequent to the addition of said silica and/or silica treated carbon black, as the case may be, in the same or subsequent mixing step, and in the same or different rubber mixer. If the coupling agent is added to the silica-containing rubber composition in the same mixing step in the same rubber mixer, it is preferred that the coupling agent is added at least one minute subsequent to the addition of the silica This order of addition of the coupling agent is considered herein to be significant. While the mechanism may not be completely understood, it is believed that, by the procedure of this invention, the hydroxyl groups of the terpolymer elastomer are allowed to preferentially interact with the hydroxyl groups (e.g. silanol groups) contained on the surface of the silica-containing reinforcing filler prior to contact with the coupling agent. As a result it is considered herein that by utilizing such order of addition, the rubber mixture can more effectively thereby be maintained at a relatively low processible plasticity and mixing viscosity level, because a premature gelling, or other possible premature reaction between the hydroxyl-containing terpolymer elastomer and coupling agent can be avoided, or at least retarded or delayed during the mixing operation.

In addition, significantly it has been observed herein that the rubber compositions containing an emulsion polymerization prepared styrene/butadiene/HPMA terpolymer elastomer, as compared to rubber compositions containing a conventional emulsion polymerization prepared styrene/butadiene copolymer rubber (E-SBR), are observed herein to demonstrate physical properties that remain relatively stable, or relatively consistent, when substantially reducing coupling agent level and/or reducing the final (drop) mixing temperature for the rubber compositions.

It has been observed herein, that under the prescribed mixing conditions of the order of addition of the coupling agent, and use of an emulsion polymerized styrene/butadiene/HPMA terpolymer elastomer in a rubber composition, as compared to a similar rubber composition utilizing a more conventional and unmodified E-SBR mixed at a relatively conventional high coupling agent level and mixing drop temperatures, that improved physical properties of the rubber composition have resulted which are believed to be predictive of enhanced tire rolling resistance, wet skid and treadwear for a tire having a tread of such rubber composition.

In one aspect of the invention, it may be desired for the silica to be in a minority insofar as the carbon black and silica reinforcement is concerned for various purposes which may, for example, be to endeavor to maximize wear resistance of the tread rubber composition.

In another aspect of the invention, it may be desired for the silica to be in a majority insofar as the carbon black and silica reinforcement is concerned for various purposes which may, for example, be to endeavor to maximize a reduction of rolling resistance and to maximize wet skid performance for the tire itself.

The amorphous silica to be used as reinforcement in the tread cap of this invention is preferably a precipitated silica, although it may be a pyrogenic, or fumed, silica. Precipitated silica is intended herein to include precipitated aluminosilicates. Such precipitated silica may be prepared, for example, by controlled acidification of a soluble silicate, e.g., sodium silicate or a combination of silicate and aluminate in the case of aluminosilicates.

In general, the amorphous silica is preferably selected from aggregates of precipitated silica and precipitated aluminosilicate having a BET surface area within a range of about 80 to about 300, preferably about 120 to about 180, $m^2/g$ and a DBP value within a range of about 100 to about 350, preferably about 150 to about 300 $m^2/g$.

A BET method of measuring surface area is described in the *Journal of the American Chemical Society*, Volume 60, Page 304 (1930).

Various commercially-available precipitated silicas may be considered for use in the tread of this invention, particularly the tread cap such as, for example only and without limitation, silica from Rhodia such as, for example, Zeosil 1165MP and Zeosil 165GR, silica from Degussa AG with designations such as, for example, BV3370GR, and silica from J. M. Huber such as, for example, Zeopol 8745 and silica from PPG Industries such as, for example, HiSil 210.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silica, and plasticizers, fillers, pigments, fatty acid, zinc oxide, waxes, antioxidants and antiozonants and peptizing agents. As known to those skilled in the art, depending on the intended use of the sulfur-vulcanizable and sulfur-vulcanized material (rubbers), the additives mentioned above are selected and commonly used in conventional amounts.

Typical additions of carbon black, silica and silica coupler for this invention are hereinbefore set forth.

In practice, an emulsion polymerization prepared styrene/butadiene/HPMA terpolymer elastomer contemplated for use in this invention preferably has a microstructure characterized by having about 15 to about 50 percent units derived from styrene, about 0.5 to about 5 percent units derived from the HPMA (hydroxypropyl methacrylate) and about 49.5 to about 85.4 percent units derived from 1,3-butadiene monomers.

The microstructure, namely the cis and trans structures, of the terpolymer are considered herein to be somewhat typical for an emulsion polymerization derived styrene/butadiene copolymer elastomer.

Preferably, the said terpolymer elastomer is further characterized by a glass transition (Tg) in a range of about 0° C. to about −65° C., preferably about −50° C. to about −20° C.

The aforesaid aqueous emulsion polymerization prepared terpolymer elastomer can be synthesized, for example, by using conventional elastomer emulsion polymerization methods.

For example, a charge composition comprised of water, one or more conjugated diolefin monomers, (e.g. 1,3-butadiene), one or more vinyl aromatic monomers (e.g. styrene) and the HPMA, a suitable polymerization initiator and emulsifier (soap). The terpolymerization may be conducted over a relatively wide temperature range such as for example, from about 4° C. to as high as 60° C., although a temperature in a range of about 4° C. to about 10° C. may be more desirable.

The emulsifiers may be added at the onset of the polymerization or may be added incrementally, or proportionally as the reaction proceeds., Anionic, cationic or nonionic emulsifiers may be employed.

In practice, the tire, as a manufactured article, may be prepared by shaping and sulfur curing the assembly of its components at an elevated temperature (e.g. 140° C. to about 160° C.) and elevated pressure in a suitable mold. Such practice is well known to those having skill in such art.

Thus, in a more specific aspect of this invention, a tire is provided having a tread component, namely an outer, circumferential tread intended to be ground-contacting, comprised of a rubber composition prepared according to this invention.

Representative of various additional conjugated diene-based elastomers for use in this invention include, for example, cis 1,4-polyisoprene rubber (natural or synthetic), cis 1,4-polybutadiene, high vinyl polybutadiene having a vinyl 1,2 content in a range of about 30 to about 90 percent, styrene/butadiene copolymers (SBR) including emulsion polymerization prepared SBR and organic solvent polymerization prepared SBR, styrene/isoprene/butadiene terpolymers, a minor amount of 3,4-polyisoprene if used, isoprene/butadiene copolymers, isoprene/styrene copolymers, acrylonitrile/butadiene copolymers, acrylonitrile/butadiene/styrene terpolymers, For convenience, said acrylonitrile/diene polymers are referred to as diene-based elastomers even though the diene might not be a major component of the elastomer.

Representative of rubber reinforcing carbon blacks for the tire tread rubber composition are those, for example, having an Iodine value (ASTM D1510) in a range of about 80 to about 160, alternatively about 100 to about 150, g/kg together with a DBP (dibutylphthalate) value (ASTM D2414) in a range of about 70 to about 200, alternatively about 100 to about 150 $cm^3/100$ g. Representative of such carbon blacks can easily be found in *The Vanderbilt Rubber Handbook,* 1978 edition, Page 417.

In practice, the silica is used in conjunction with a silica coupling agent to couple the silica with the elastomer(s) and, thus, enhance the elastomer reinforcing effect of the silica.

In particular, such coupling agents are sometimes composed of a trialkoxysilane polysulfide which has a constituent component, or moiety, (the alkoxysilane portion) capable of reacting with the silica surface, namely silanol groups on the silica surface and, also, a constituent component, or moiety, (the polysulfide portion) capable of reacting with the rubber, particularly a sulfur-vulcanizable rubber which contains carbon-to-carbon double bonds, or unsaturation. In this manner, then the coupler acts as a connecting bridge between the silica and the rubber and, thereby, enhances the rubber reinforcement aspect of the silica.

Numerous coupling agents are taught for use in combining silica and rubber such as, for example, silane coupling agents containing a polysulfide component, or structure, such as bis-(3-trialkoxysilylalkyl) polysulfide having an average of from 2.2 to 2.6 or from 3.5 to 4 connecting sulfur atoms in its polysulfidic bridge. Exemplary of such materials is bis-(3-triethoxysilylpropyl) polysulfide.

It is readily understood by those having skill in the art that the rubber composition would be compounded by methods generally known in the rubber compounding art, such as mixing the various sulfur-vulcanizable constituent rubbers with various commonly used additive materials such as, for example, curing aids such as sulfur, activators, retarders and accelerators, processing additives, such as oils, resins including tackifying resins, and plasticizers, non-reinforcing fillers, pigments, fatty acid, zinc oxide, waxes, antioxidants and antiozonants, peptizing agents. As known to those skilled in the art, depending on the intended use of the sulfur vulcanizable and sulfur-vulcanized material (rubbers), the additives mentioned above are selected and commonly used in conventional amounts.

Typical amounts of reinforcing fillers for this invention are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook*, (1978), Pages 344 through 346. Typical amounts of antiozonants comprise about 1 to 5 phr. Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention which is more primarily directed to the preparation of tire treads of a cap/base construction where the tread cap is of a rubber composition which contains a combination of emulsion polymerization derived terpolymer rubber of diene/vinyl aromatic compound/hydroxypropyl methacrylate (HPMA) which is reinforced with, for example, silica and carbon black with silica or carbon black being in the majority.

The mixing of the rubber composition can be accomplished by methods known to those having skill in the rubber mixing art. For example, the ingredients may be mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art.

The invention may be better understood by reference to the following examples in which the parts and percentages are by weight unless otherwise indicated.

EXAMPLE I

In this Example, silica reinforced rubber compositions comprised of emulsion polymerization prepared styrene/butadiene copolymer elastomer and cis 1,4-polybutadiene rubber are prepared and referred to herein as Control Sample A and Control Sample C. The Control Samples differ from each other in that for Control Sample C, less coupling agent is used (9 parts instead of 12 parts of the coupler composite) and, also a lower mixing (drop) temperature was used (140° C. instead of 160° C.).

Similar silica reinforced rubber compositions are prepared as Sample B and Sample D except that a styrene/butadiene/HPMA terpolymer elastomer, with pendant hydroxyl groups, was substituted for the styrene/butadiene copolymer elastomer with the resulting Sample B otherwise being comparative to Control Sample A and Sample D otherwise being comparative to Control Sample C.

Therefore, for comparative purposes, it is intended herein that Sample B be compared to Control Sample A and that Sample D be compared to Control Sample C.

The rubber compositions were prepared in an internal rubber mixer using three separate stages of addition (mixing), namely, two sequential non-productive mix stages (without the sulfur and accelerator curatives) to a temperature of about 140° C. (Samples C and D) and about 160° C. (Samples A and B) and one final productive mix stage (with sulfur and accelerator curatives) to a temperature of about 115° C. In each case, the coupling agent was added in the non-productive mixing stage after the silica addition.

Materials used for this Example are illustrated in the following Table 1.

TABLE 1

|  | Control Example A | Example B | Control Example C | Example D |
|---|---|---|---|---|
| First Non-product Mixing | | | | |
| Emulsion SBR rubber[1] | 75 | 0 | 75 | 0 |
| Emulsion SBR-HPMA terpolymer[2] | 0 | 75 | 0 | 75 |
| Cis 1,4-polybutadiene rubber[3] | 25 | 25 | 25 | 25 |
| Precipitated silica[4] | 75 | 75 | 75 | 75 |
| Coupling agent[5] | 12 | 12 | 9 | 9 |
| Processing oil and waxes[6] | 21.5 | 21.5 | 21.5 | 21.5 |
| Stearic acid | 3 | 3 | 3 | 3 |
| Second Non-productive Mixing | | | | |
| Antidegradants[7] | 2.3 | 2.3 | 2.3 | 2.3 |
| Productive Mixing | | | | |
| Sulfur | 2 | 2 | 2 | 2 |
| Accelerator, sulfenamide and guanidine types | 3.2 | 3.2 | 3.2 | 3.2 |
| Zinc oxide | 2.5 | 2.5 | 2.5 | 2.5 |

[1]Styrene/butadiene copolymer elastomer, non oil extended, prepared by aqueous emulsion polymerization, from The Goodyear Tire & Rubber Company with the following properties: Mooney ML/4 viscosity at 100° C. of about 63; styrene content of about 38 weight percent; glass transition temperature (Tg) of about −37° C. at a DSC (scanning calorimeter) mid point
[2]Styrene/butadiene/HPMA terpolymer elastomer, having pendant hydroxyl groups, obtained by terpolymerizing 1,3-butadiene, styrene and hydroxypropylmethacrylate (HPMA) monomers to form an aqueous latex, using potassium oleate soap as an emulsifier, and the terpolymer elastomer recovered therefrom. For such terpolymerization, 53 parts 1,3-butadiene, 44 parts styrene and 3 parts of HPMA are charged to a suitable reactor which contained water and potassium oleate soap as an emulsifier. A conventional iron/sodium formaldehyde sulfoxylate activated hydroperoxide initiator system was employed and t-dodecyl mercaptan was utilized as a polymerization modifier. The polymerization was carried out at a temperature of about 10° C. and was shortstopped at a monomer conversion of about 65 to 70 percent. The HPMA was a blend of 2-hydroxypropyl methcrylate and 3-hydroxypropyl methacrylate isomers in a weight ratio of about 80/20, respectively, as obtained from the Aldrich Chemical company. The final material, or blend, is characterized by having a styrene level, or content, of about 36 percent and a Tg of about −36° C.
[3]Cis 1,4-polybutadiene elastomer obtained as Budene 1207 from The Goodyear Tire & Rubber Company having a Tg of about −104° C.
[4]Obtained as Zeosil 1165MP from the Rhodia S.A. company.
[5]Composite of bis-(3-triethoxysilylproyl) disulfide (obtained as X266S from Degussa S.A.) and carbon black in a 50/50 weight ratio so that the disulfide material is 50 percent of the value reported in Table 1
[6]Aromatic rubber processing oil and microcrystalline and paraffinic waxes
[7]Phenylenediamine type Various physical properties of the rubber Samples are shown in the following Table 2 with the Stress-Strain, Rebound, Hardness, DIN abrasion and Tear resistance tests being conducted on vulcanized rubber samples.

TABLE 2

|  | Control Example A | Example B | Control Example C | Example D |
|---|---|---|---|---|
| Rheometer Data (150° C.) (MDR Moving Die Rheometer, Monsanto) | | | | |
| Minimum torque (dNm) | 2.17 | 3.31 | 3.15 | 3.56 |
| Maximum torque (dNm) | 20 | 18.4 | 25.5 | 18 |
| T90 (minutes) | 12.9 | 12.7 | 14.9 | 16.7 |
| Mooney Plasticity (ML/4 100° C.) | 41 | 45 | 44 | 49 |
| Non soluble polymer content (%) | 46 | 66 | 37 | 64 |
| Rebound (Zwick) | | | | |
| 23° C. (percent) | 37.3 | 35.1 | 34 | 34.6 |
| 100° C. (percent) | 60 | 65 | 57 | 64.3 |
| RPA at 100° C. and 10% Strain | | | | |
| Tan.Delta | 0.12 | 0.09 | 0.17 | 0.11 |
| Shore A hardness at 23° C. | 64 | 65 | 65 | 64 |
| DIN abrasion, vol. loss (mm³) | 97 | 88 | 115 | 92 |
| Tear resistance 100° C. (N/mm) | 24.6 | 17.5 | 31.5 | 25.2 |
| Stress-Strain (ASTM D412) | | | | |
| Tensile strength (MPa) | 22.9 | 23.2 | 23.3 | 22.5 |
| Elongation @ break, % | 475 | 395 | 610 | 455 |
| 100% modulus (MPa) | 2.5 | 2.6 | 2.1 | 2.3 |
| 300% modulus (MPa) | 13.2 | 16.2 | 9.5 | 12.8 |
| 300/100 modulus ratio | 5.3 | 6.25 | 4.5 | 5.55 |

[1]Determined by immersing the sample in tetrahydrofurane at 23° C. for 24 hours It can be seen from Table 2 that use of the styrene/butadiene/HPMA elastomeric terpolymer in Sample B exhibited higher Rebound value at 100° C. and lower Tan.Delta value at 100° C. as compared to Control Sample A. which is predictive of a reduced rolling resistance for a tire with a tread of such rubber composition.

A similar observation for the Rebound (100° C.) and Tan Delta values are seen for Sample D as compared to Control Sample C.

It can further be seen from Table 2 use of the elastomeric terpolymer in Sample B, as compared to Control Sample A, exhibited a reduced DIN abrasion loss, increased non-soluble polymer and increased modulus ratio, which is predictive of reduced treadwear for a tire having a tread of such rubber composition.

A similar observation for the DIN abrasion loss, increased non-soluble polymer and increased modulus ratio are seen for Sample D as compared to Control Sample C.

It can also be seen from Table 2 that use of the elastomeric terpolymer in Sample B, as compared to Control Sample A, exhibited an equal or slightly improved Rebound (23° C.) value which is indicative of equal or better wet skid resistance for a tire with a tread of such rubber composition.

A similar observation for the Rebound (23° C.) for Sample D as compared to Control Sample C.

This is considered herein to be significant because of the indicated improvements, which are considered herein to be in a relationship to an increased rubber/silica reinforcement interaction express through an increased non-soluble polymer and 300/100 modulus ratio, are achieved at an almost equivalent rubber composition plasticity (Mooney viscosity values) and rubber processability.

It can further be seen from Table 2 that use of the elastomeric terpolymer exhibited a much less pronounced variation in physical properties when moving Sample B to Sample D as compared to use of a styrene/butadiene copolymer elastomer when moving from Control Sample A to Control Sample C. In both cases, the move being 25 percent reduction in the amount of coupling agent (from 12 to 9 parts of the coupler composite) in combination with a reduction in the final temperature from 160° C. to 140° C.

This is considered herein to be significant because use of the elastomeric terpolymer in Sample D with reduced amount of coupling agent and lower final mixing temperature for the non-productive mixing stage is seen to result in improving the rebound (100° C.), tan delta (100° C.), non-soluble polymer values, 300/100 modulus ratio, and DIN abrasion value, as compared to representative Control Sample C which used the unmodified styrene/butadiene copolymer elastomer at an original coupling agent level, or amount (12 parts of coupler/carbon black composite) and higher final mixing temperature of 160° C.

It can also be seen from Table 2 that the tear property and elongation at break value of the rubber composition of Sample D which used the terpolymer elastomer with pendant hydroxyl groups, actually reached values similar to those of Control Sample A which used the unmodified styrene/butadiene copolymer elastomer.

Finally, the order of addition of the silica and coupling agent is considered herein be significant for the use of the styrene/butadiene/HPMA terpolymer elastomer with pendant hydroxyl group in order to maintain processible Mooney viscosity values, or plasticities of the unvulcanized elastomer.

In particular, it is considered herein that the coupling agent is to be added to the rubber composition subsequent to the addition of the silica (preferably at least one minute following the addition of the silica), and therefore exclusive of adding the coupling agent prior to or simultaneously with the silica. The subsequent addition of the coupling agent can be accomplished be adding the silica and coupling agent either in the same non-productive mixing stage or in a separate, subsequent, non-productive mixing stage.

While various embodiments are disclosed herein for practicing the invention, it will be apparent to those skilled in this art that various changes and modifications may be made therein without departing from the spirit or scope of the invention.

What is claimed is:

1. A tire having a tread of a rubber composition which is prepared a process comprised of blending, based on 100 parts by weight (phr) of rubber:
    (A) 100 phr of elastomers consisting of
        (1) about 25 to about 75 phr of aqueous emulsion polymerization prepared terpolymer rubber comprised of repeat units derived from monomers consisting of:
            (a) about 49.5 to about 84.5 weight percent of 1,3-butadiene,
            (b) about 15 to about 50 weight percent of styrene, and
            (c) about 0.5 to about 5 weight percent of a co-monomer selected from at least one of the group consisting of hydroxymethyl methacrylate, 2-hydroxyethyl methacrylate, 2-hydroxypropyl methacrylate (HPMA isomer), 3-hydroxypropyl methacrylate (HPMA isomer), 3-phenoxy-2-hydroxypropyl methacrylate, hydroxybutyl methacrylate, hydroxyhexyl methacrylate and hydroxyoctyl methacrylate, and
        (2) from 25 to about 75 phr of at least one additional conjugated diene-based elastomer selected from the group consisting of homopolymers and copolymers of monomers selected from the group consisting of least one of isoprene and 1,3 butadiene and copolymers of monomers consisting of at least one of isoprene and 1,3-butadiene with styrene,
    (B) about 40 to about 120 phr reinforcing filler selected from at least one of carbon black and particulate synthetic amorphous silica;
    wherein said filler is comprised of
        (1) about 35 to about 90 phr of carbon black and about 5 to about 30 phr of said synthetic amorphous silica, or
        (2) about 5 to about 30 phr of carbon black and about 35 to about 90 phr of said synthetic amorphous silica, and
    (C) about 1 to about 7 phr of at least one silica coupling agent having a moiety reactive with hydroxyl groups on the surface of the said synthetic amorphous silica and an additional moiety interactive with the said elastomer(s);
    wherein said rubber composition is prepared by a process which comprises:
        (1) blending, in at least one mixing step in an internal mixer and in the absence of free sulfur, said terpolymer rubber, and additional diene-based elastomer(s) if used, together with said reinforcing filler(s) to include a portion of said synthetic amorphous silica, to a temperature in a range of about 140° C. to about 175° C.;
        (2) blending therewith in the same or subsequent mixing step in an internal rubber mixer and in the absence of free sulfur, said coupling agent and the remaining amount of said synthetic amorphous silica to a temperature in a range of about 140° C. to about 175° C.,
        (3) subsequently blending free sulfur therewith in an internal rubber mixer to a temperature in a range of about 100° C. to about 125° C.

2. The tire of claim 1 wherein said co-monomers are selected from at least one of 2-hydroxypropyl methacrylate and 3-hydroxy-propyl methacrylate.

3. The tire of claim 1 wherein said co-monomers are a blend of 2-hydroxypropyl methacrylate and 3-hydroxy-propyl methacrylate and in weight ratio in a range of from about 85/15 to about 60/40.

4. The tire of claim 1 wherein said carbon black is present in an amount of about 35 to about 90 phr and said synthetic amorphous silica is present in amount of about 5 to about 30 phr whereby, insofar as the said carbon black and synthetic amorphous silica are concerned, the carbon black is in the majority.

5. The tire of claim 1 wherein said carbon black is present in an amount of about 5 to about 30 phr and said synthetic amorphous silica is present in amount of about 35 to about 90 phr whereby, insofar as said carbon black and synthetic amorphous silica are concerned, the synthetic amorphous silica is in the majority.

6. The tire of claim 1 wherein said synthetic amorphous silica is selected from at least one of precipitated silica and precipitated aluminosilicate.

7. The tire of claim 1 wherein said silica-containing material is said synthetic amorphous silica and wherein said synthetic amorphous silica is selected from at least one of precipitated silica and precipitated aluminosilicate having a BET surface area in a range of about 80 to about 300 $m^2/g$ and a DBP value in a range of about 100 to about 350 $cm^3/100$ g.

8. The tire of claim 1 wherein said silica-containing material is said synthetic amorphous silica and wherein said coupling agent is a bis(3-trialkoxysilylalkyl) polysulfide having an average of from 2.2 to 2.6 or from 3.5 to 4 connecting sulfur atoms in its polysulfidic bridge.

9. The tire of claim 8 wherein said coupling agent is a bis(3-triethoxysilylpropyl) polysulfide.

10. The tire of claim 1 wherein said silica-containing material is said synthetic amorphous silica and wherein said coupling agent is a bis(3-triethoxysilylpropyl) polysulfide having an average of from 2.2 to 2.6 connecting sulfur atoms in its polysulfidic bridge.

11. The tire of claim 1 wherein said silica-containing material is said synthetic amorphous silica and wherein said terpolymer rubber has a Tg in a range of about −65° C. to about 0° C., and a non oil extended unvulcanized polymer Mooney (ML/4, 100° C.) in a range from 50 to 120.

* * * * *